(12) United States Patent
Lange

(10) Patent No.: US 10,932,463 B2
(45) Date of Patent: Mar. 2, 2021

(54) GAME CALMING ASSEMBLY

(71) Applicant: Jeffrey Lange, Remus, MI (US)

(72) Inventor: Jeffrey Lange, Remus, MI (US)

( * ) Notice: Subject to any disclaimer, the term of this patent is extended or adjusted under 35 U.S.C. 154(b) by 270 days.

(21) Appl. No.: 15/925,759

(22) Filed: Mar. 19, 2018

(65) Prior Publication Data

US 2019/0281815 A1   Sep. 19, 2019

(51) Int. Cl.
*A01M 31/06* (2006.01)
*F16M 13/02* (2006.01)

(52) U.S. Cl.
CPC .......... *A01M 31/06* (2013.01); *F16M 13/022* (2013.01); *F16M 2200/022* (2013.01); *F16M 2200/024* (2013.01); *F16M 2200/06* (2013.01)

(58) Field of Classification Search
CPC ...... A01M 31/06; A01M 31/00; A01M 29/06; A01M 31/025; A01M 31/02; Y10S 135/901; F41J 1/10; F41J 1/00; F16M 13/022; F16M 13/02; F16M 2200/06; F16M 2200/022; F16M 11/2014; F16M 2200/021; F16M 2200/08; F16M 2200/028
USPC ........................................ 43/2; 273/407, 390
See application file for complete search history.

(56) References Cited

U.S. PATENT DOCUMENTS

| | | | |
|---|---|---|---|
| 5,029,408 A | 7/1991 | Smith | |
| 5,154,390 A * | 10/1992 | Bain | A47B 97/04 248/284.1 |
| 5,274,942 A | 1/1994 | Lanius | |
| 5,459,958 A | 10/1995 | Reinke | |
| 5,515,637 A * | 5/1996 | Johnson | A01M 31/06 43/2 |
| 5,632,110 A | 5/1997 | Roy | |
| 6,092,322 A | 7/2000 | Samaras | |
| 6,216,382 B1 | 4/2001 | Lindaman | |
| 6,442,884 B1 * | 9/2002 | Sceery | A01M 31/06 43/2 |
| 6,775,943 B2 | 8/2004 | Loughman | |
| 2008/0209792 A1 * | 9/2008 | Watlov | A01M 31/06 43/2 |
| 2010/0294900 A1 * | 11/2010 | Maurer | A45F 3/44 248/156 |
| 2013/0104443 A1 * | 5/2013 | Cramer | A01M 31/06 43/2 |
| 2016/0021869 A1 * | 1/2016 | George | A47C 9/10 135/96 |

* cited by examiner

*Primary Examiner* — Peter M Poon
*Assistant Examiner* — Jeffrey R Larsen

(57) ABSTRACT

A game calming assembly for calming game into danger includes a mount that engages and extends away from a support surface. The mount comprises a first arm that has a first end and a second end. A second arm is pivotally coupled to the second end and has a proximal end and a distal end relative to the first arm. A coupler releasably couples the second end of the first arm to the proximal end of the second arm wherein an angle between the first arm and the second arm is adjustable when the coupler is released. A foot is attached to and extends outwardly from the first end. The foot is extends through and engages the support surface. A support is attached to and extends upwardly from the distal end of the second arm. A decoy is mounted on the support.

1 Claim, 6 Drawing Sheets

GAME CALMING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to attracting devices and more particularly pertains to a new attracting device for luring game into danger.

BRIEF SUMMARY OF THE INVENTION

An embodiment of the disclosure meets the needs presented above by generally comprising a mount that engages and extends away from a support surface. The mount comprises a first arm that has a first end and a second end. A second arm is pivotally coupled to the second end. The second arm has a proximal end and a distal end relative to the first arm. A coupler releasably couples the second end of the first arm to the proximal end of the second arm wherein an angle between the first arm and the second arm is adjustable when the coupler is released. A foot is attached to and extends outwardly from the first end. The foot is configured to extend through and engage the support surface. A support is attached to and extends upwardly from the distal end of the second arm. A decoy is mounted on the support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
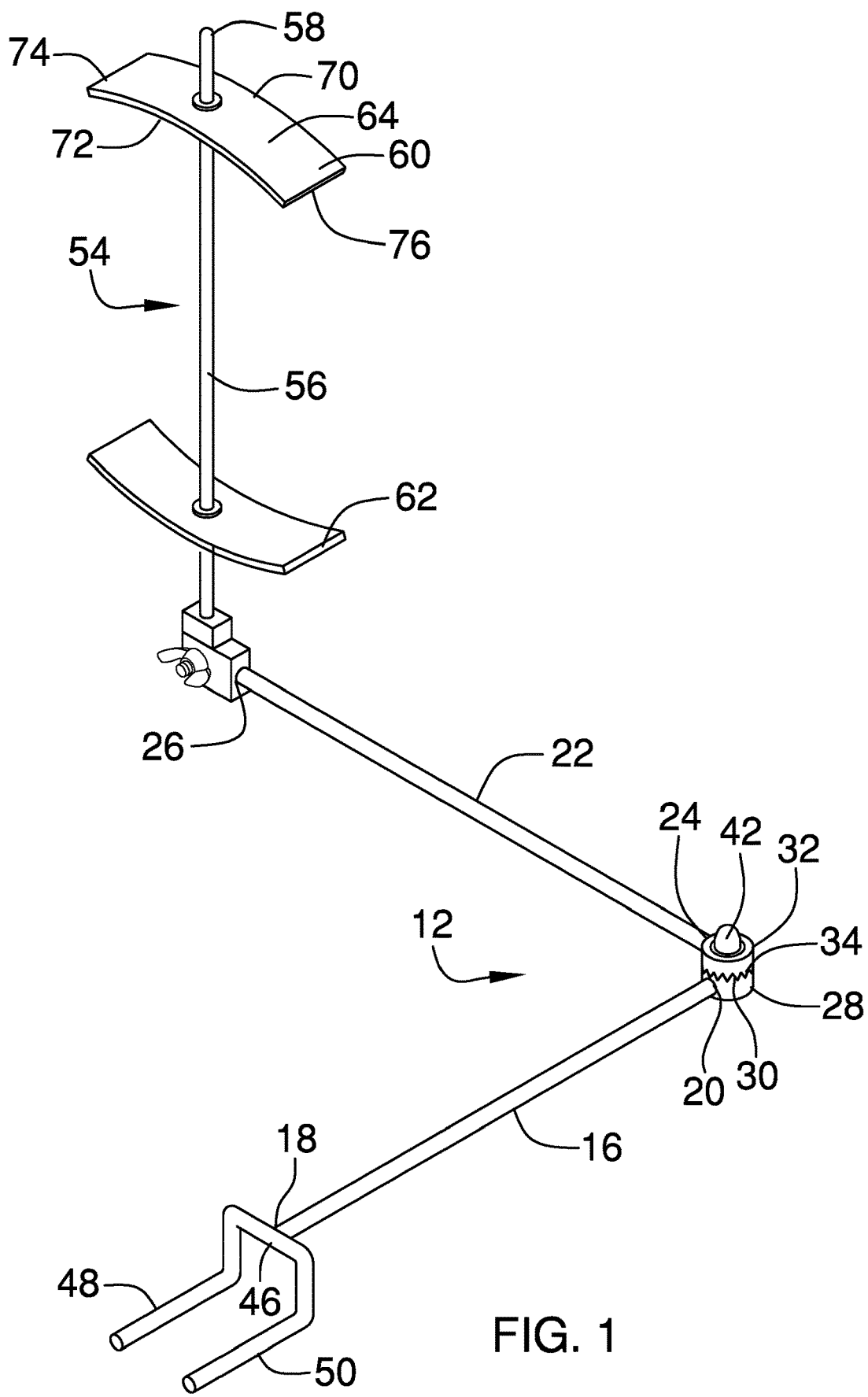
FIG. 1 is a top side view of a game calming assembly according to an embodiment of the disclosure.
Figure 2:
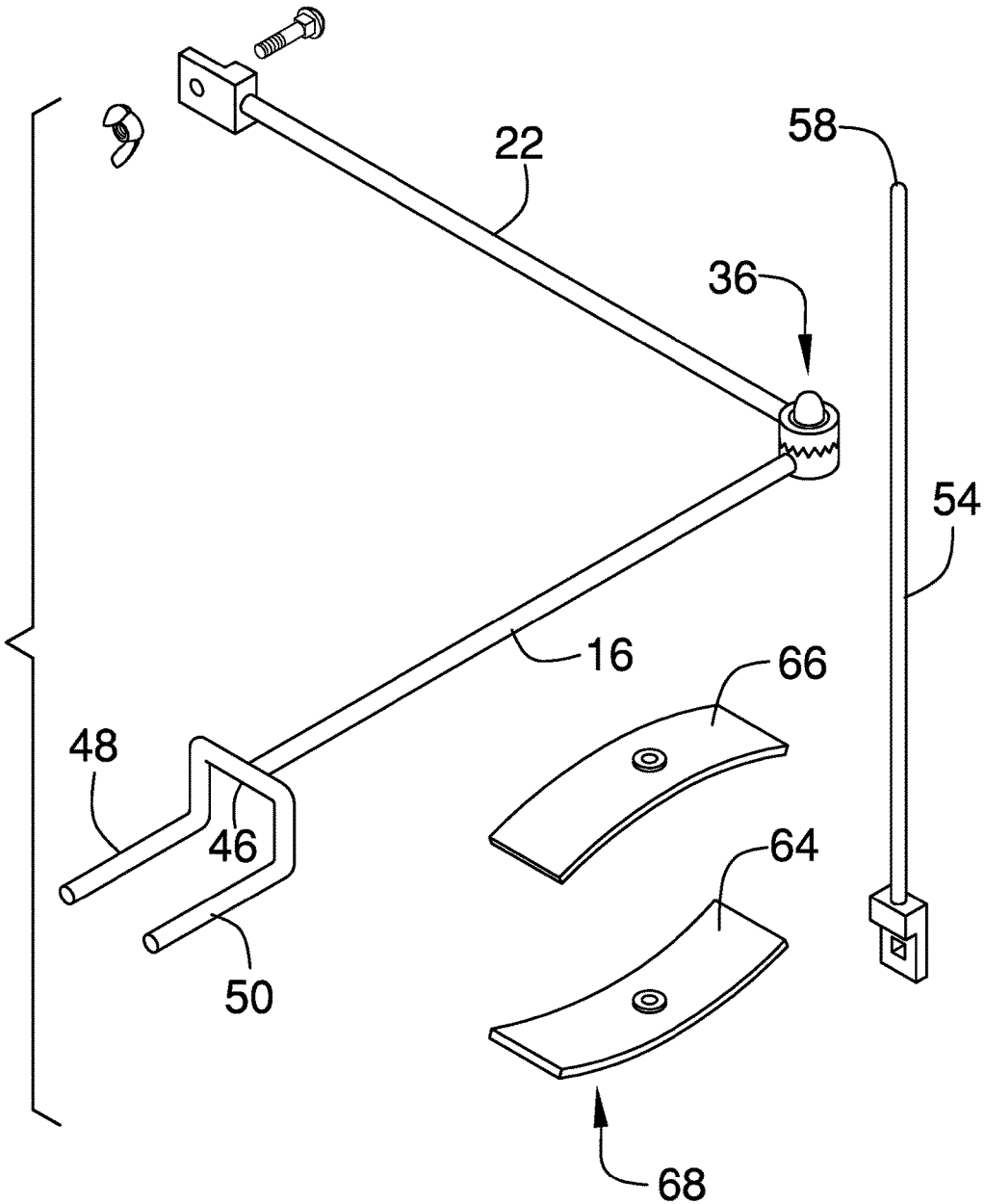
FIG. 2 is a component view of an embodiment of the disclosure.
Figure 3:
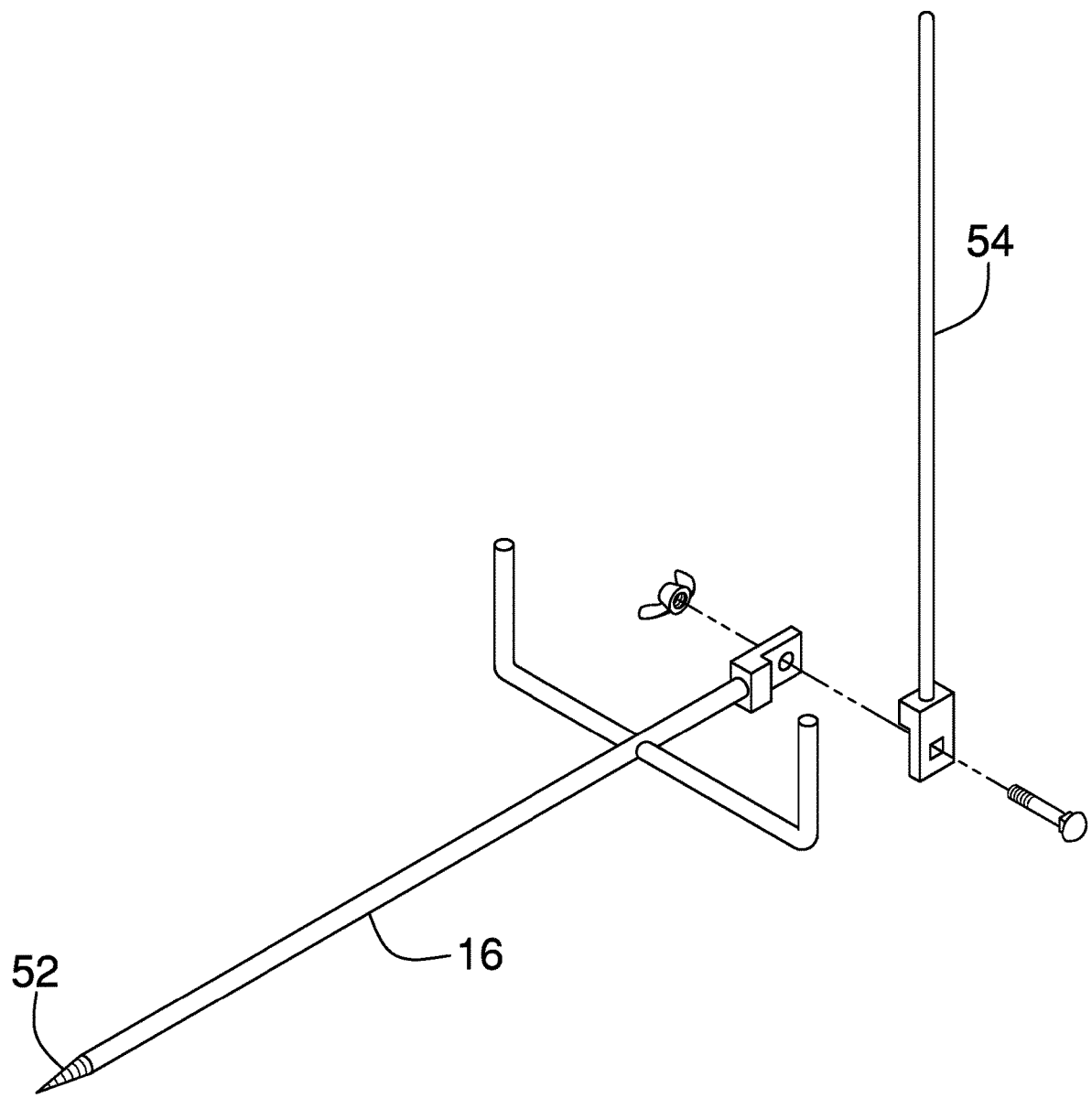
FIG. 3 is a top side view of an embodiment of the disclosure.
Figure 4:
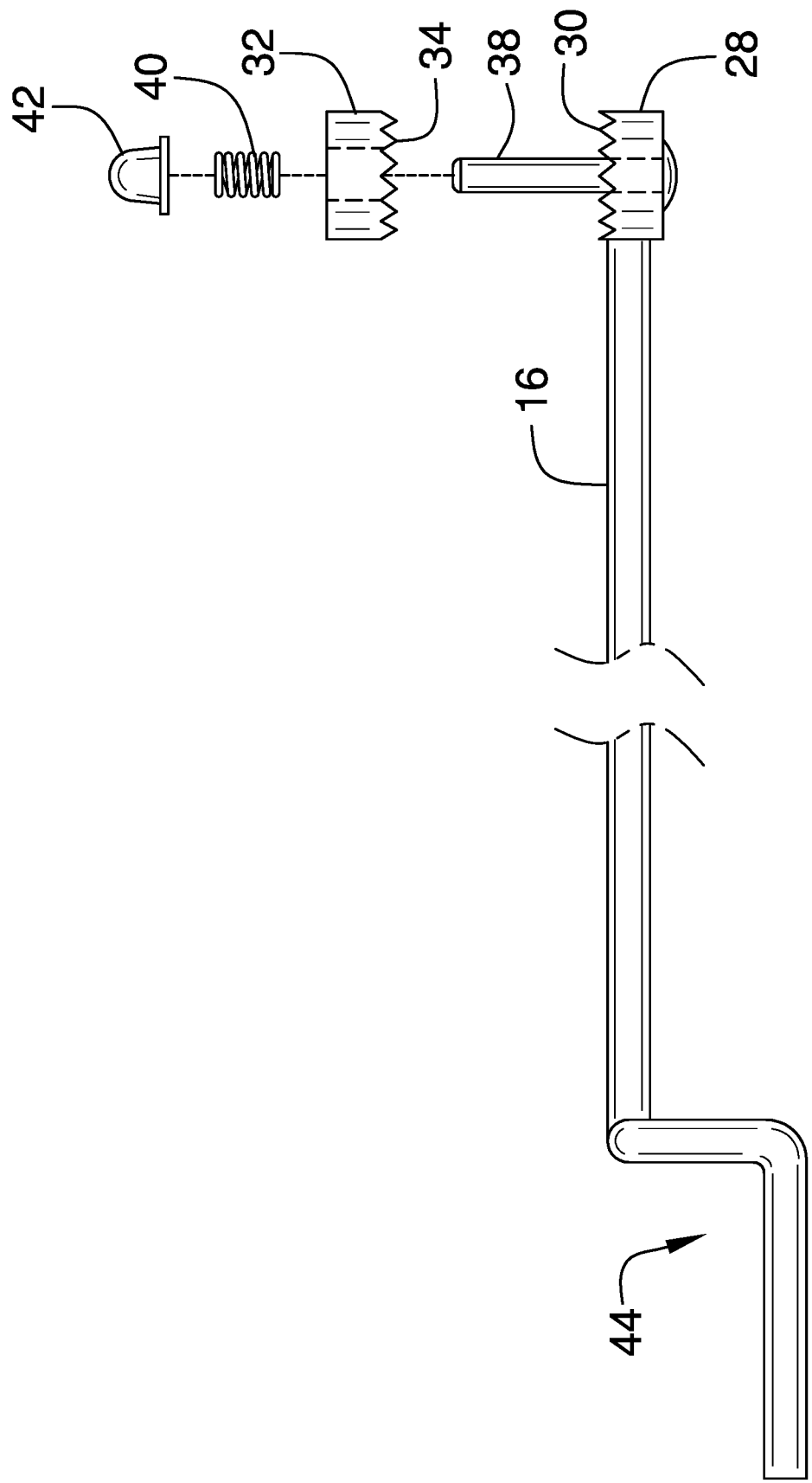
FIG. 4 is a broken side view of an embodiment of the disclosure.
Figure 5:
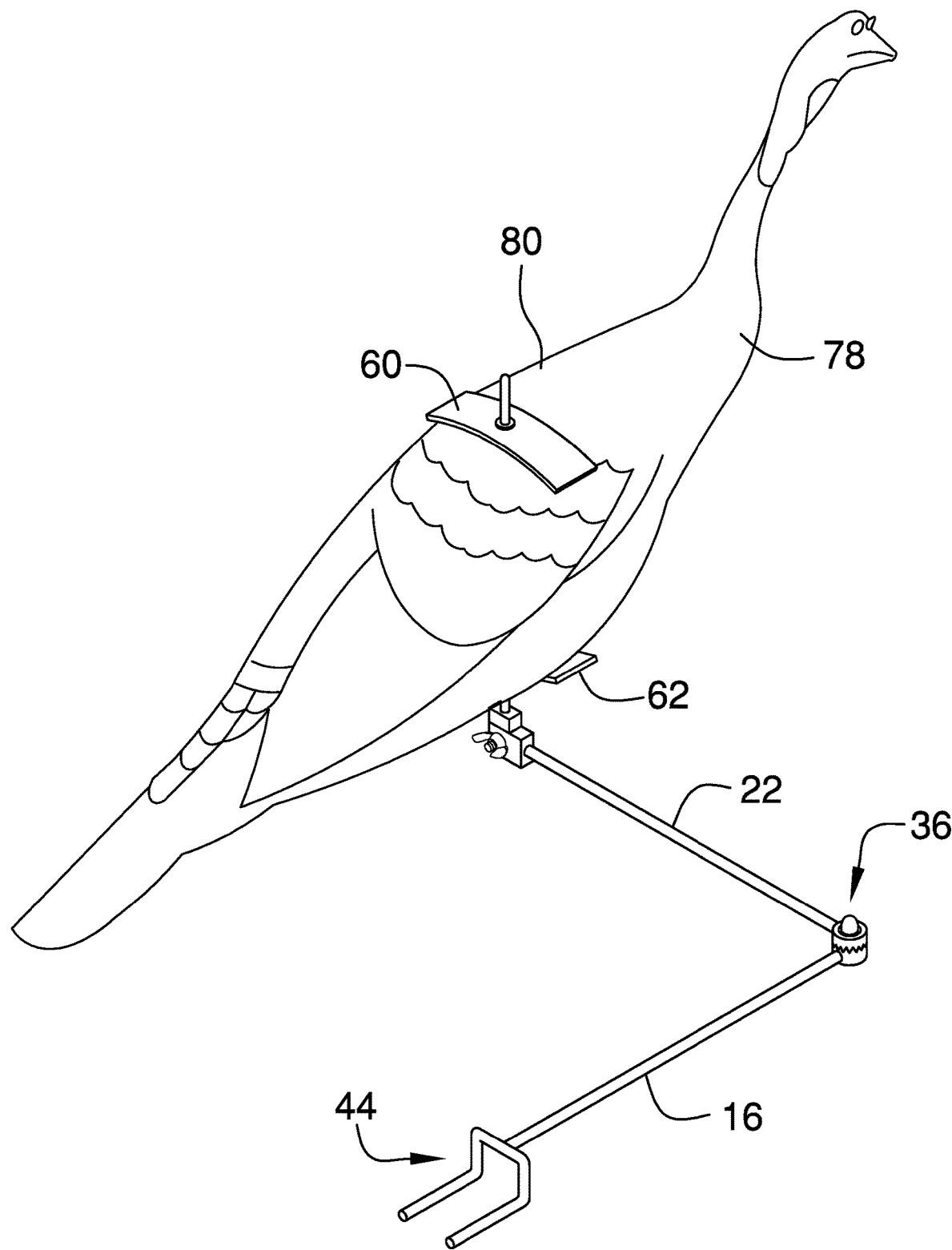
FIG. 5 is a top side view of an embodiment of the disclosure.
Figure 6:
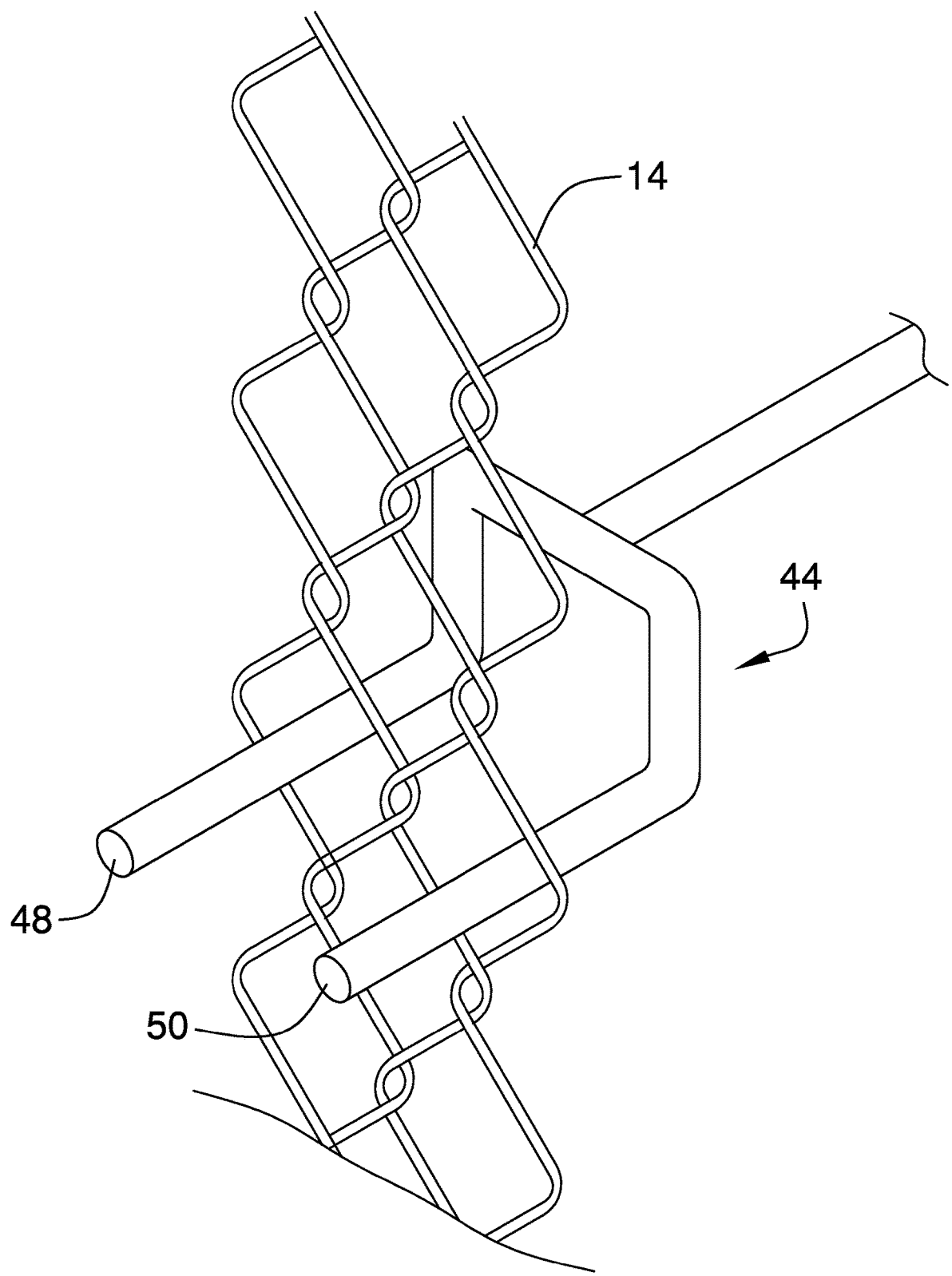
FIG. 6 is broken front side view of an embodiment of the disclosure.

With reference now to the drawings, and in particular to FIGS. 1 through 6 thereof, a new attracting device embodying the principles and concepts of an embodiment of the disclosure and generally designated by the reference numeral 10 will be described.

As best illustrated in FIGS. 1 through 6, the game calming assembly 10 generally comprises a mount 12 that engages and extends away from a support surface 14. The mount 12 comprises a first arm 16 that has a first end 18 and a second end 20 and may be elongated from the first end 18 to the second end 20. A second arm 22 is pivotally coupled to the second end 20 and has a proximal end 24 and a distal end 26 relative to the first arm 16. Additionally, the second arm 22 may be elongated from the proximal end 24 to the distal end 26. A first mating member 28 is attached to the second end 20 of the first arm 16 and has a first engagement surface 30 comprised of teeth. A second mating member 32 is attached to the proximal end 24 of the second arm 22 that engages the first mating member 28 to retain a selected angle between the first arm 16 and the second arm 22. The second mating member 32 has a second engagement surface 34 comprised of teeth. The first engagement surface 30 and the second engagement surface 34 inhibit rotation between the first arm 16 and the second arm 22 when engaged, but allow the angle between the first arm 16 and the second arm 22 to be adjusted when released.

A coupler 36 releasably couples the second end 20 of the first arm 16 to the proximal end 24 of the second arm 22 wherein the angle between the first arm 16 and the second arm 22 is adjustable when the coupler 36 is released. The coupler 36 includes a pin 38 that extends through the first mating member 28 and the second mating member 32. A biasing member 40 is mounted on the pin 38 and biases the first mating member 28 toward the second mating member 32. Moreover, a fastener 42 is positioned on and releasably retains first 28 and second 32 mating members on the 38.

A foot 44 is attached to and extends outwardly from the first end 18 of the first arm 16. The foot 44 extends through and engages the support surface 14. Moreover, the foot 44 may comprise a middle portion 46, a first outward portion 48 and a second outward portion 50 that is attached to and extends outwardly from the middle portion 46. The first outward portion 48 and the second outward portion 50 are spaced from each other and define a U-shape. The first outward portion 48 and the second outward portion 50 extend through the support surface 14 and support the first arm 16 and the second arm 22. The support surface 14 may comprise a mesh screen of a hunting blind. In an alternative embodiment the foot 44 may comprise a pointed and threaded coupling member 52. In this embodiment the mount 12 is engaged to a tree by twisting the coupling member 52 into a tree.

A support 54 is attached to and extends upwardly from the distal end 26 of the second arm 22. The support 54 comprises a rod 56 that may be orientated perpendicular to the second arm 22. The rod 56 has a free end 58 relative to the second arm 22. A first retention member 60 is mounted on the rod 56 and is removably positioned nearer to the free end 58 than the second arm 22. A second retention member 62 is mounted on the rod 56 and is positioned nearer to the second arm 22 than the free end 58. The first retention member 60 and the second retention member 62 comprise a plate 64 wherein the plate 64 has an upwardly facing surface 66, a downwardly facing surface 68, a front edge 70, a back edge 72, a first lateral edge 74, and a second lateral edge 76. The plate 64 is elongated from the first lateral edge 74 to the second lateral edge 76.

A decoy 78 is mounted on the mount 12. The support 54 extends through the decoy 78 wherein the decoy is positioned on the upwardly facing surface 66 of the second retention member 62. The downwardly facing surface 68 of the first retention member 60 engages a top side 80 of the decoy 78 to retain the decoy 78 on the rod 56. The decoy 78 may comprise a faux turkey, but may be any animal such as a bird or squirrel native to the region that may lure game by giving the appearance that the area is safe.

In use, the first outward portion 48 and the second outward portion 50 are extended through the support surface 14 to secure the mount 12 to the support surface 14. The coupler 36 is released and an angle between the first arm 16 and the second arm 22 is set. The decoy 78 is placed on the support 54 and the first retention member 60 is engaged to the decoy 78 to retain the decoy 78 in place. The decoy 78 gives the appearance to game that the area is safe from hunters.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A game attraction assembly comprising:
   a mount configured to be engaged with and extend away from a support surface, said mount comprising:
      a first arm having a first end and a second end, said first arm being elongated from said first end to said second end;
      a second arm being pivotally coupled to said second end, said second arm having a proximal end and a distal end relative to said first arm, said second arm being elongated from said proximal end to said distal end;
      a first mating member being attached to said second end of said first arm, said first mating member having a first engagement surface comprised of teeth;
      a second mating member being attached to said proximal end of said second arm, said second mating member engaging said first mating member to retain the angle between said first arm and said second arm, said second mating member having a second engagement surface comprised of teeth;
      a coupler releasably coupling said second end of said first arm to said proximal end of said second arm wherein an angle between said first arm and said second arm is adjustable when said coupler is released, said coupler including a pin that extends through said first mating member and said second mating member, a biasing member being mounted on said pin and biases the first mating member toward the second mating member, a fastener is positioned on said pin and retains said first and second mating members on said pin;
      a foot being attached to and extending outwardly from said first end, said foot being configured to extend through and engage the support surface, said foot comprising a middle portion, a first outward portion and a second outward portion being attached to and extending outwardly from said middle portion, said first outward portion and said second outward portion being spaced from each other and defining a U-shape, said first outward portion and said second outward portion extending through the support surface and supporting said first arm and said second arm wherein the support surface comprises a mesh screen of a hunting blind;
      a support being attached to and extending upwardly from said distal end of said second arm, said support comprising a rod, said rod being orientated perpendicular to said second arm, said rod having a free end opposite said second arm, a first retention member being mounted on said rod and being removably positioned nearer to said free end than to said second arm, a second retention member being mounted on said rod and being positioned nearer to said second arm than to said free end, said first retention member and said second retention member each comprising a respective plate, each said plate having an upwardly facing surface, a downwardly facing surface, a front edge, a back edge, a first lateral edge, and a second lateral edge, each said plate being elongated from said first lateral edge to said second lateral edge; and
   a decoy being mounted on said mount, said support extending through said decoy wherein said decoy is positioned on said upwardly facing surface of said second retention member, said downwardly facing surface of said first retention member engaging a top side of said decoy to retain said decoy on said rod, said decoy comprising a faux turkey.

* * * * *